(12) United States Patent
Wu et al.

(10) Patent No.: US 12,259,312 B2
(45) Date of Patent: Mar. 25, 2025

(54) SYSTEM FOR MONITORING INTERNAL CORROSION OF PIPELINE BASED ON RADIO-FREQUENCY IDENTIFICATION (RFID)

(71) Applicant: Sichuan University, Chengdu (CN)

(72) Inventors: Jianbo Wu, Chengdu (CN); Muchao Zhang, Chengdu (CN); Yawen Lan, Chengdu (CN)

(73) Assignee: Sichuan University, Chengdu (CN)

( * ) Notice: Subject to any disclaimer, the term of this patent is extended or adjusted under 35 U.S.C. 154(b) by 497 days.

(21) Appl. No.: 17/866,417

(22) Filed: Jul. 15, 2022

(65) Prior Publication Data

US 2022/0357267 A1    Nov. 10, 2022

(30) Foreign Application Priority Data

Mar. 1, 2022    (CN) .......................... 202210199369.4

(51) Int. Cl.
*G01N 17/02*    (2006.01)
*F17D 5/06*    (2006.01)
*G06K 19/07*    (2006.01)

(52) U.S. Cl.
CPC .............. *G01N 17/02* (2013.01); *F17D 5/06* (2013.01); *G06K 19/0717* (2013.01)

(58) Field of Classification Search
CPC ....... G01N 17/02; F17D 5/06; G06K 19/0717
See application file for complete search history.

(56) References Cited

U.S. PATENT DOCUMENTS

| | | | |
|---|---|---|---|
| 9,881,250 B2* | 1/2018 | Lovell | G05B 15/02 |
| 2002/0171438 A1* | 11/2002 | Dudley | C23F 13/04 |
| | | | 324/637 |
| 2019/0293547 A1* | 9/2019 | Daneshmand | G01N 22/02 |
| 2020/0191754 A1* | 6/2020 | Findikoglu | G01N 29/223 |

FOREIGN PATENT DOCUMENTS

| | | | | |
|---|---|---|---|---|
| CN | 203148874 U | 8/2013 | | |
| CN | 106706506 A | 5/2017 | | |
| CN | 108112260 A | * 6/2018 | ............. | E21B 23/10 |
| WO | WO-2010072324 A1 | * 7/2010 | ............... | F17D 5/00 |

* cited by examiner

*Primary Examiner* — Natalie Huls
*Assistant Examiner* — Nyla Gavia

(57) ABSTRACT

A system for monitoring internal corrosion of a pipeline based on radio-frequency identification (RFID), including a magnetizing device, a RFID tag sensor, and a reader. The magnetizing device is placed on the pipeline, and includes an armature, a first permanent magnet, a first pole shoe, a second permanent magnet and a second pole shoe. The RFID tag sensor is placed on the pipeline, and at the same side with the magnetizing device. The reader is in wireless communication connection with the RFID tag sensor through a reader antenna.

5 Claims, 2 Drawing Sheets

SYSTEM FOR MONITORING INTERNAL CORROSION OF PIPELINE BASED ON RADIO-FREQUENCY IDENTIFICATION (RFID)

CROSS-REFERENCE TO RELATED APPLICATIONS

This application claims the benefit of priority from Chinese Patent Application No. 202210199369.4, filed on Mar. 1, 2022. The content of the aforementioned application, including any intervening amendments thereto, is incorporated herein by reference in its entirety.

TECHNICAL FIELD

This application relates to pipeline monitoring, and more particularly to a system for monitoring internal corrosion of a pipeline based on radio-frequency identification (RFID).

BACKGROUND

Pipeline has been widely applied as an important basic pressure-bearing component in the long-distance transportation of petroleum and natural gas, and its quality is crucial to the safe transportation. Nevertheless, the pipeline inner wall is prone to corrosion, loss, cavitation and crack when suffering stress, electrochemical deterioration, vibration, and external impact. Such defects will greatly attenuate the service performance of the pipeline if not monitored and solved in time, and even result in severe security incidents. In view of this, various automated non-destructive inspection methods are adopted for monitoring the pipeline quality, such as magnetic flux leakage testing, ultrasonic guided-waves testing, optical fiber sensor testing, eddy current testing and infrared thermographic testing. Although these strategies can effectively monitor the pipeline corrosion, they still struggle with expensive and large-scale equipment, which is not suitable for the monitor of pipelines under harsh and extreme natural environments. Moreover, the equipment needs to be checked regularly, and requires complex instruments and cables, which results in high cost, and thus not suitable for the large-scale monitoring.

Radio-frequency identification (RFID) is a passive, wireless and maintenance-free non-contact identification technique. These characteristics make it suitable for the miniaturized and low-cost monitor or pipelines. Unfortunately, the exiting RFID technologies are generally applied to monitor of the corrosion on the outer surface of the pipeline due to the skin effect, but fail to enable the monitor of the internal corrosion of the pipeline. Thus, it is urgently required to develop an approach applicable to the monitor of the internal corrosion of the pipeline.

SUMMARY

An objective of this application is to provide a system for monitoring internal corrosion of a pipeline based on radio-frequency identification (RFID) to overcome the defects of bulky structure, high cost, insufficient accuracy, complex assembly and disassembly in the existing pipeline monitoring technologies.

Technical solutions of this application are described as follows.

This application provides a system for monitoring internal corrosion of a pipeline based on radio-frequency identification (RFID), comprising:

a magnetizing device;
a RFID tag sensor; and
a reader;
wherein the magnetizing device is placed on the pipeline, and comprises an armature, a first permanent magnet, a first pole shoe, a second permanent magnet and a second pole shoe; the first pole shoe and the second pole shoe are arranged on an outer wall of the pipeline; the first permanent magnet is located above the first pole shoe, and is fixedly connected to the first pole shoe; the second permanent magnet is located above the second pole shoe, and is fixedly connected to the second pole shoe; the armature is located above the first permanent magnet and the second permanent magnet; one end of the armature is fixedly connected to the first permanent magnet, and the other end of the armature is fixedly connected to the second permanent magnet;
the RFID tag sensor is placed on the pipeline, and located on the same side as the magnetizing device; and
the reader is in wireless communication connection with the RFID tag sensor through a reader antenna.

In an embodiment, the RFID tag sensor comprises an ultra-high frequency (UHF) RFID chip and a permeability-sensitive antenna; and
the permeability-sensitive antenna comprises a metal ground plate, a dielectric substrate and a metal radiation patch; a first surface of the dielectric substrate is fixedly connected to the metal ground plate, and a second surface of the dielectric substrate is fixedly connected to the metal radiation patch; a microstrip structure is provided at a middle of the metal radiation patch; an end of the microstrip structure is fixedly connected to the UHF RFID chip.

In an embodiment, the RFID tag sensor is attached to the pipeline through adhesive bonding; and a length direction of the permeability-sensitive antenna is perpendicular to a magnetization direction of the magnetizing device.

In an embodiment, the dielectric substrate is made of a glass-reinforced epoxy laminate composite material.

In an embodiment, an impedance of the permeability-sensitive antenna is conjugate with an impedance of the UHF RFID chip.

Compared with the prior art, this application has the following beneficial effects:

1) With regard to the system provided herein, the magnetizing device is placed on the pipeline, and is configured to form a complete magnetic circuit with the pipeline, so as to magnetize the pipeline. When the internal corrosion of the pipeline occurred, the corrosion will lead to magnetic distortion, thereby resulting in the disturbance of the magnetic permeability on the surface of the pipeline. The RFID tag sensor attached to the pipeline is configured to monitor the internal corrosion of the pipeline via detecting the disturbance of the magnetic permeability on the surface of the pipeline, so as to obtain monitored data. The monitored data is transmitted to the reader via wireless signals to realize a data exchange. Compared with the prior art, the system provided herein has the advantages of light structure, low cost, high monitoring accuracy, simple assembly and disassembly and convenient maintenance, facilitating the application of the technology of monitoring the internal corrosion of the pipeline, and has a huge application prospect.

2) When the permeability-sensitive antenna of the RFID tag sensor is attached to the pipeline, the metal ground plate is fully in contact with the surface of the pipeline.

The surface of the pipeline is configured to be a ground plane of the permeability-sensitive antenna to monitor the magnetic permeability distortion resulted from the internal corrosion of the pipeline. The metal radiation patch attached to the dielectric substrate is configured to transform the disturbance of the magnetic permeability on the surface of the pipeline into resonant frequency shift of the permeability-sensitive antenna. The resonant frequency shift (RFS) increases with the increase of the internal corrosion depth of the pipeline.

3) The impedance of the permeability-sensitive antenna is conjugated with the impedance of the ultra-high frequency RFID chip, so as to match the impedance of the permeability-sensitive antenna and the impedance of the ultra-high frequency RFID chip, optimizing the signal transmission quality.

Figure 1:
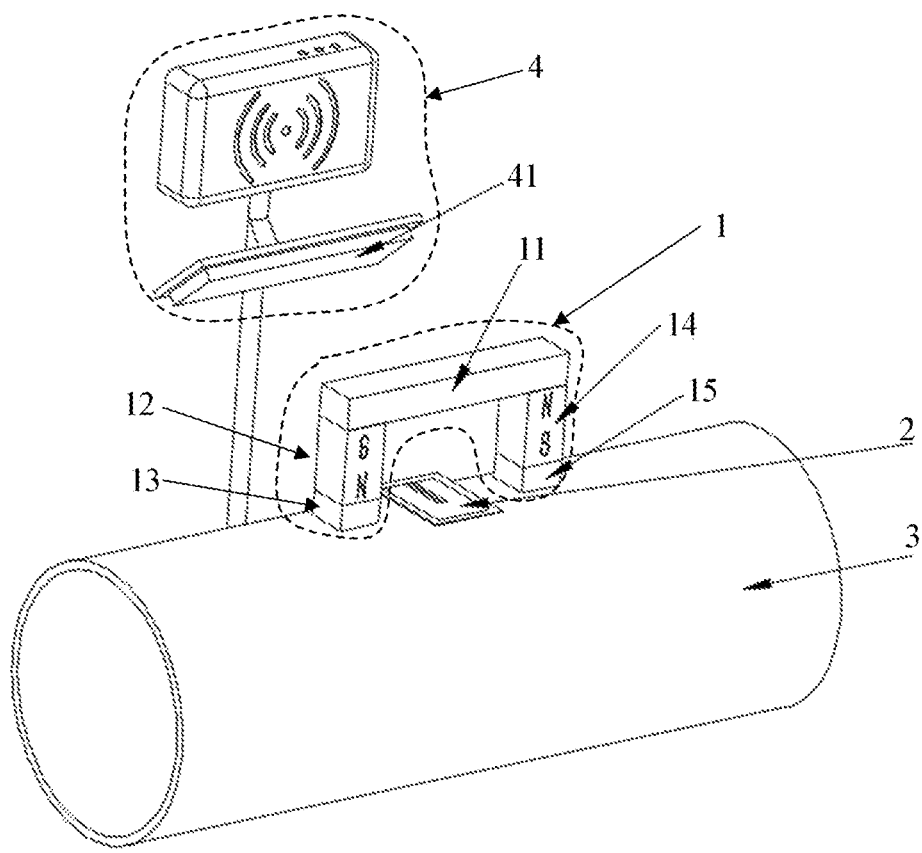
FIG. 1 is a system for monitoring internal corrosion of a pipeline based on radio-frequency identification (RFID) according to an embodiment of this application.

In the drawings, 1, magnetizing device; 2, RFID tag sensor; 3, pipeline; 4, reader; 11, armature; 12, first permanent magnet; 13, first pole shoe; 14, second permanent magnet; 15, second permanent magnet; 21, metal ground plate; 22, dielectric substrate; 23, metal radiation patch; 24, ultra-high frequency RFID chip; 41, reader antenna.

DETAILED DESCRIPTION OF EMBODIMENTS

This application will be described in detail below with reference to the following embodiments and accompanying drawings, so as to facilitate the understanding of this application. It should be noted that the embodiments are merely illustrative, and not intended to limit this application. Any variations made by those skilled in the art without departing from the spirit and scope of the application should fall within the scope of the application defined by the appended claims.

Referring to an embodiment shown in FIG. 1, a system for monitoring corrosion on an inner wall of a pipeline based on radio-frequency identification (RFID) is provided herein. The system includes a magnetizing device 1, a RFID tag sensor 2, and a reader 4. The magnetizing device 1 is placed on a pipeline 3. The magnetizing device 1 includes an armature 11, a first permanent magnet 12, a first pole shoe 13, a second permanent magnet 14 and a second pole shoe 15. The first pole shoe 13 and the second pole shoe 15 are arranged on an outer wall of the pipeline 3. The first permanent magnet 12 is located above the first pole shoe 13, and is fixedly connected to the first pole shoe 13. The second permanent magnet 14 is located above the second pole shoe 15, and is fixedly connected to the second pole shoe 15. The armature 11 is located above the first permanent magnet 12 and the second permanent magnet 14. One end of the armature 11 is fixedly connected to the first permanent magnet 12, and the other end of the armature 11 is fixedly connected to the second permanent magnet 14.

Figure 2:
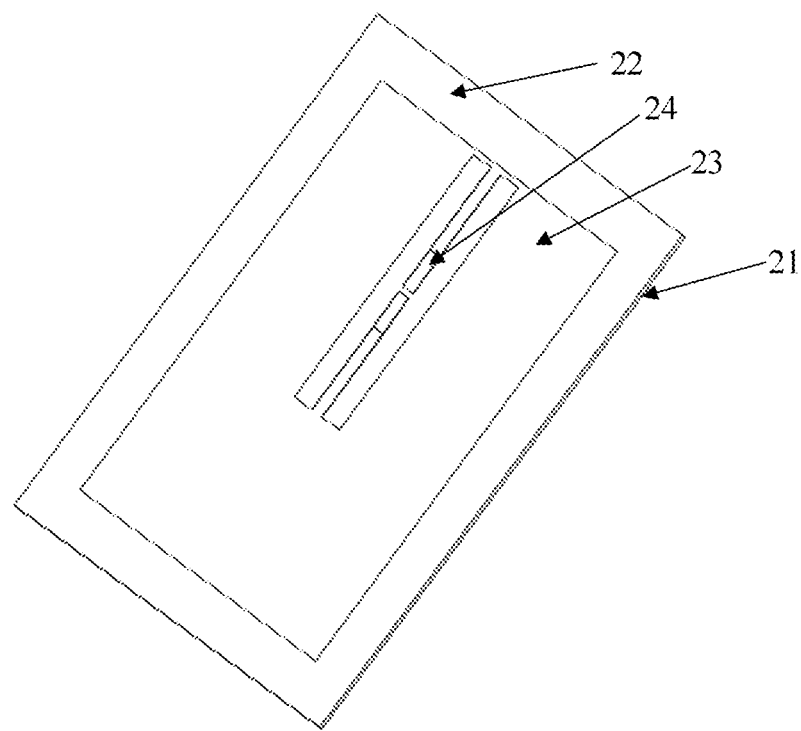
FIG. 2 is a structural diagram of a RFID tag sensor according to an embodiment of this application.

The RFID tag sensor 2 is placed on the pipeline 3, and located on the same side as the magnetizing device 1. Referring to an embodiment shown in FIG. 2, the RFID tag sensor 2 includes an ultra-high frequency (UHF) RFID chip 24 and a permeability-sensitive antenna. The permeability-sensitive antenna includes a metal ground plate 21, a dielectric substrate 22 and a metal radiation patch 23. The dielectric substrate 22 is made of a glass-reinforced epoxy laminate composite material. A first surface of the dielectric substrate 22 is fixedly connected to the metal ground plate 21, and a second surface of the dielectric substrate 22 is fixedly connected to the metal radiation patch 23. A microstrip structure is provided in a middle of the metal radiation patch 23. An end of the microstrip structure is fixedly connected to the UHF RFID chip 24. A length direction of the permeability-sensitive antenna is perpendicular to a magnetization direction of the magnetizing device 1. An impedance of the permeability-sensitive antenna is conjugate with an impedance of the UHF RFID chip 24.

The reader 4 is in wireless communication connection with the RFID tag sensor 2 through a reader antenna 41.

In this embodiment, the magnetizing device 1 is provided on the pipeline 3, and is configured to form a complete magnetic circuit with the pipeline 3, so as to magnetize the pipeline 3. When the internal corrosion of the pipeline 3 occurred, the internal corrosion will lead to magnetic distortion, thereby resulting in the disturbance of a magnetic permeability on the surface of the pipeline 3. The RFID tag sensor 2 attached to the pipeline 3 is configured to monitor the internal corrosion of the pipeline 3 via detecting the disturbance of the magnetic permeability on the surface of the pipeline 3, so as to obtain monitored data. The monitored data is transmitted to the reader 4 via wireless signals to realize a data exchange.

This application is based on the following scientific principles.

According to the skin effect, a skin depth where the current loss is concentrated in the pipeline 3 is calculated as follows:

$$\delta = \frac{1}{\sqrt{\pi f \mu \sigma}};$$

where $\mu$ is the magnetic permeability; $\delta$ is an electric conductivity; f is a frequency. It can be implied that the resonant frequency shift (RFS) of the permeability-sensitive antenna of the RFID tag sensor 2 reflects a change in material properties around an area where the surface crack and the internal corrosion of the pipeline 3 occurs.

An expression of the resonant frequency of the RFID tag sensor 2 is as follows:

$$f_{res} = \frac{c}{4\sqrt{\varepsilon_{re}}} \cdot \frac{1}{L + \Delta L_{oc}};$$

$$\varepsilon_{re} = \frac{\varepsilon_r + 1}{2} + \frac{\varepsilon_r - 1}{2\sqrt{1 + 10h/W}};$$

$$\Delta L_{oc} = 0.412h \frac{(\varepsilon_{re} + 0.3)\left(\frac{W}{h} + 0.264\right)}{(\varepsilon_{re} - 0.258)\left(\frac{W}{h} + 0.813\right)};$$

where c is a light velocity; $\varepsilon_{re}$ is an effective dielectric constant; L is a length of the metal radiation patch 23; $\Delta L_{oc}$ is a compensation length; $\varepsilon_r$ is a dielectric coefficient; h is a thickness of the dielectric substrate 22; and W is a width of the metal radiation patch 23.

When the corrosion occurred inside the material of the pipeline 3, metal and air will disturb the magnetic field distribution due to the difference in material properties. After magnetic field lines are compressed, one part of the magnetic field lines passes through a space above the corrosion in the pipeline, and the other part of the magnetic field lines leaks into the air on the other side of the corrosion. According to magnetic field distribution, a magnetic field intensity H above the corrosion is intensified. Considering that a variation of the magnetic field is corresponding to the different positions on a μ-H curve of a ferromagnetic material, the uneven distribution of the magnetic field caused by the internal corrosion of the pipeline 3 will lead to the disturbance of the magnetic permeability on the surface of the pipeline 3, such that the internal corrosion is transformed into the disturbance of the magnetic permeability monitored by the RFID tag sensor 2.

A microstrip structure is provided to ensure an anti-metal performance of the permeability-sensitive antenna. During operation, the permeability-sensitive antenna is placed on an outer surface of the pipeline 3. The outer surface of the pipeline 3 is configured to be a ground plane of the permeability-sensitive antenna to monitor the magnetic distortion resulted from the internal corrosion of the pipeline.

The magnetic field disturbance caused by the internal corrosion of the pipeline 3 in a magnetized state will cause the disturbance of the magnetic permeability on the surface of the pipeline. Under the same intensity of magnetization, the magnetic permeability of a surface area of the pipeline 3 where the internal corrosion occurs increases as a corrosion burial depth increases. The disturbance of the magnetic permeability is allowed to be determined by the resonant frequency or the resonant frequency shift (RFS) of the permeability-sensitive antenna, and thus the RFS increases with the increase of the depth of the internal corrosion of the pipeline 3. The magnetic field lines are compressed due to the defects, such that the magnetic intensity of the skin depth layer of the pipeline is intensified, and an area directly facing the crack defect has the maximum magnetic intensity. In addition, the shallower the corrosion burial depth, the greater the magnetic field variations.

Figure 3:
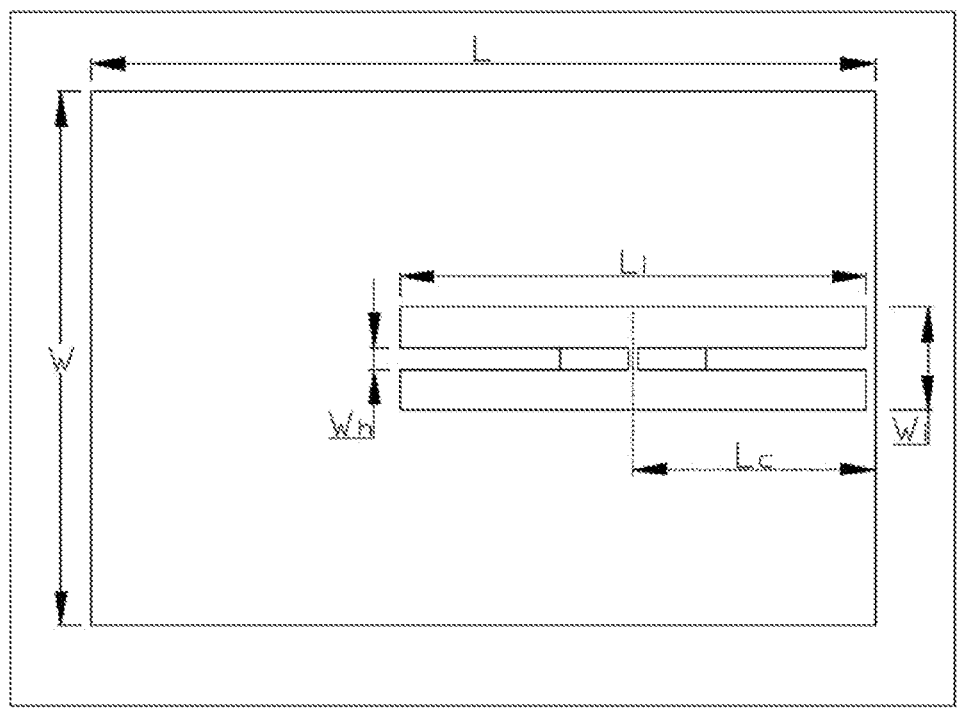
FIG. 3 shows dimension of the RFID tag sensor according to an embodiment of this application.

The permeability-sensitive antenna is designed for the UHF band, and is configured to transform the internal corrosion of the pipeline into the disturbance of the magnetic permeability to be detected by the UHF RFID chip 24. The specific dimensions (dimension indication is shown in FIG. 3) of the permeability-sensitive antenna are designed as exhibited in Table 1.

TABLE 1

Specific dimensions of permeability-sensitive antenna (mm)

| L | W | $L_i$ | $W_i$ | $L_c$ | $W_h$ |
|---|---|---|---|---|---|
| 69 | 47 | 41 | 9 | 21.3 | 2 |

The impedance of the permeability-sensitive antenna is conjugated with the impedance of the UHF RFID chip, so as to match the impedance of the permeability-sensitive antenna and the impedance of the UHF RFID chip, optimizing the signal transmission quality.

In conclusion, compared with the prior art, the system provided herein has the advantages of light structure, low cost, high monitoring accuracy, simple assembly and disassembly and convenient maintenance, and the RFID tag sensor has the advantages of passive wireless and maintenance-free, lowering the cost, and facilitating the application of the technology of monitoring the internal corrosion of the pipeline, and has a huge application prospect.

The principles and implementations of this application are illustrated by the description of the specific embodiments. Described above is merely used to help understand the method and the core idea of this application. For those skilled in the art, any changes of the embodiments and application scopes can be made according the spirit of the application. In conclusion, this description should not be understood as limitations of this application.

It should be understood by those of ordinary skill in the art that the embodiments described above are merely intended to facilitate the understanding of the principles of this application, but not to limit this application. It should be understood that any modifications and combinations made by those skilled in the art without departing from the spirit and scope of the application should fall within the scope of the application defined by the appended claims.

What is claimed is:

1. A system for monitoring internal corrosion of a pipeline based on radio-frequency identification (RFID), comprising:
   a magnetizing device;
   a RFID tag sensor; and
   a reader;
   wherein the magnetizing device is placed on the pipeline, and comprises an armature, a first permanent magnet, a first pole shoe, a second permanent magnet and a second pole shoe; the first pole shoe and the second pole shoe are arranged on an outer wall of the pipeline; the first permanent magnet is located above the first pole shoe, and is fixedly connected to the first pole shoe; the second permanent magnet is located above the second pole shoe, and is fixedly connected to the second pole shoe; the armature is located above the first permanent magnet and the second permanent magnet; one end of the armature is fixedly connected to the first permanent magnet, and the other end of the armature is fixedly connected to the second permanent magnet;
   the RFID tag sensor is placed on the pipeline, and located on the same side as the magnetizing device; and
   the reader is in wireless communication connection with the RFID tag sensor through a reader antenna.

2. The system of claim 1, wherein the RFID tag sensor comprises an ultra-high frequency (UHF) RFID chip and a permeability-sensitive antenna; and
   the permeability-sensitive antenna comprises a metal ground plate, a dielectric substrate and a metal radiation patch; a first surface of the dielectric substrate is fixedly connected to the metal ground plate, and a second surface of the dielectric substrate is fixedly connected to the metal radiation patch; a microstrip structure is provided at a middle of the metal radiation patch; an end of the microstrip structure is fixedly connected to the UHF RFID chip.

3. The system of claim 2, wherein the RFID tag sensor is attached to the pipeline through adhesive bonding; and a length direction of the permeability-sensitive antenna is perpendicular to a magnetization direction of the magnetizing device.

4. The system of claim 2, wherein the dielectric substrate is made of a glass-reinforced epoxy laminate composite material.

5. The system of claim 2, wherein an impedance of the permeability-sensitive antenna is conjugate with an impedance of the UHF RFID chip.

* * * * *